(12) United States Patent
Zirkle et al.

(10) Patent No.: US 10,791,728 B2
(45) Date of Patent: Oct. 6, 2020

(54) ELECTRONIC BAIT STATION MONITORING SYSTEM

(71) Applicant: OMS Investments, Inc., Los Angeles, CA (US)

(72) Inventors: Ashley Zirkle, Delaware, OH (US); Charles Evan Meyers, Marysville, OH (US)

(73) Assignee: OMS Investments, Inc., Los Angeles, CA (US)

(*) Notice: Subject to any disclaimer, the term of this patent is extended or adjusted under 35 U.S.C. 154(b) by 452 days.

(21) Appl. No.: 15/534,446

(22) PCT Filed: Dec. 7, 2015

(86) PCT No.: PCT/US2015/064206
§ 371 (c)(1),
(2) Date: Jun. 8, 2017

(87) PCT Pub. No.: WO2016/094274
PCT Pub. Date: Jun. 16, 2016

(65) Prior Publication Data
US 2017/0360026 A1 Dec. 21, 2017

Related U.S. Application Data

(60) Provisional application No. 62/089,657, filed on Dec. 9, 2014.

(51) Int. Cl.
*A01M 25/00* (2006.01)
*A01M 31/00* (2006.01)
(Continued)

(52) U.S. Cl.
CPC ........ *A01M 31/002* (2013.01); *A01M 25/004* (2013.01); *G01G 17/00* (2013.01);
(Continued)

(58) Field of Classification Search
CPC .... A01M 1/026; A01M 25/00; A01M 25/002; A01M 25/004; A01M 31/002; A01M 2200/011
See application file for complete search history.

(56) References Cited

U.S. PATENT DOCUMENTS

| 6,796,081 B2 | 9/2004 | Anderson et al. |
| 6,836,999 B2 * | 1/2005 | Rich ..................... A01M 19/00 43/98 |

(Continued)

FOREIGN PATENT DOCUMENTS

WO 2016094274 A1 6/2016

OTHER PUBLICATIONS

International Search Report and Written Opinion received for International Application No. PCT/US2015/064206, dated Feb. 5, 2016, 6 pages.

*Primary Examiner* — Thanh Pham
(74) *Attorney, Agent, or Firm* — Ulmer & Berne LLP

(57) ABSTRACT

A bait station having an enclosed housing defining an internal volume is disclosed, wherein the internal volume is divided by a partition wall defining a main chamber and an electronics compartment. The electronics compartment has a wireless communication module including a computer processor and transceiver. The main chamber has a single access for a targeted type of pest and a bait access door. A bait platform is located within the main chamber, and a bait monitoring sensor is also located within the main chamber. The bait monitoring sensor is communicatively coupled with the wireless communication module.

20 Claims, 3 Drawing Sheets

(51) Int. Cl.
  *G01G 17/00*    (2006.01)
  *G01G 19/64*    (2006.01)
  *H04Q 9/00*    (2006.01)

(52) U.S. Cl.
  CPC ............... *G01G 19/64* (2013.01); *H04Q 9/00*
          (2013.01); *H04Q 2209/40* (2013.01)

(56) References Cited

U.S. PATENT DOCUMENTS

| | | |
|---|---|---|
| 7,348,890 B2 | 3/2008 | Barber et al. |
| 7,530,195 B2 | 5/2009 | Müller et al. |
| 2002/0062205 A1* | 5/2002 | Roberts ................. A01M 1/026 |
| | | 702/188 |
| 2003/0160699 A1 | 8/2003 | Trompen |
| 2004/0140900 A1* | 7/2004 | Barber ................. A01M 1/026 |
| | | 340/573.2 |
| 2007/0256350 A1* | 11/2007 | Cates .................... A01M 1/026 |
| | | 43/132.1 |
| 2008/0187565 A1* | 8/2008 | Hill ....................... A01M 1/026 |
| | | 424/405 |
| 2008/0204253 A1 | 8/2008 | Cottee et al. |
| 2010/0134301 A1* | 6/2010 | Borth .................... A01M 1/026 |
| | | 340/573.2 |
| 2016/0219858 A1* | 8/2016 | Cink .................... A01M 1/2011 |

\* cited by examiner

ELECTRONIC BAIT STATION MONITORING SYSTEM

CROSS REFERENCES TO RELATED APPLICATIONS

This is a National Stage Application under 35 U.S.C. § 371 of PCT International Application No. PCT/US15/64206 filed Dec. 7, 2015, entitled "Electronic Bait Station Monitoring System," which claims the priority benefit of U.S. Provisional Application 62/089,657, filed Dec. 9, 2014, entitled "Electronic Bait Station Monitoring System." The disclosure of these two priority applications are incorporated herein by reference in its entirety.

BACKGROUND

Rodents, such as mice and rats, and other pests, such as cockroaches and termites, present hazards to both the health and enjoyment of the human habitations, such as residences and business locations. Various methods and systems have been developed for control of these pest in these environments, including baits, such as rodenticides and insecticides. Such methods and can be particularly effective in treating infestations of pests. Bait stations provide a mechanism for isolating the bait, such as the rodenticide or insecticide, from children, pets, other domestic animals, and non-target wildlife. Some bait stations are sealed and are disposed of following depletion of the bait. Other bait stations can have the bait replaced. In either case, determining the status of the bait station (i.e., the status of the bait) typically requires physical interaction with the bait station. Interaction with a bait station involves removal of a locked, bolted, or otherwise secured bait station lid. This process can be tedious and time consuming, especially in settings where multiple bait stations are in simultaneous use.

These and other drawbacks exist.

SUMMARY OF THE INVENTION

An exemplary embodiment includes a bait station having an enclosed housing defining an internal volume, wherein the internal volume is divided by a partition wall defining a main chamber and an electronics compartment; the electronics compartment having a wireless communication module including a computer processor and transceiver; the main chamber having a single access for a targeted type of pest and a bait access door; a bait platform located within the main chamber; and a bait monitoring sensor located within the main chamber that is communicatively coupled with the wireless communication module.

Another exemplary embodiment includes a system including a bait station having an enclosed housing defining an internal volume, wherein the internal volume is divided by a partition wall defining a main chamber and an electronics compartment; the electronics compartment having a wireless communication module including a computer processor and transceiver; the main chamber having an access for a targeted type of pest and a bait access door; a bait platform located within the main chamber; a bait monitoring sensor located within the main chamber that is communicatively with the wireless communication module; a network element, wherein the network element comprises one or more processors, the network element being configured to: receive, via a network, a signal from the wireless communication module of one or more bait stations; and provide, via the network, the wireless communication module signal to a software program on one or more electronic devices; and the software program being configured to interpret and display information pertaining to the one or more bait stations based on the wireless communication module signal.

These and other embodiments and advantages will become apparent from the following detailed description, taken in conjunction with the accompanying drawings, illustrating by way of example the principles of the various exemplary embodiments.

DETAILED DESCRIPTION OF THE INVENTION

Figure 1:
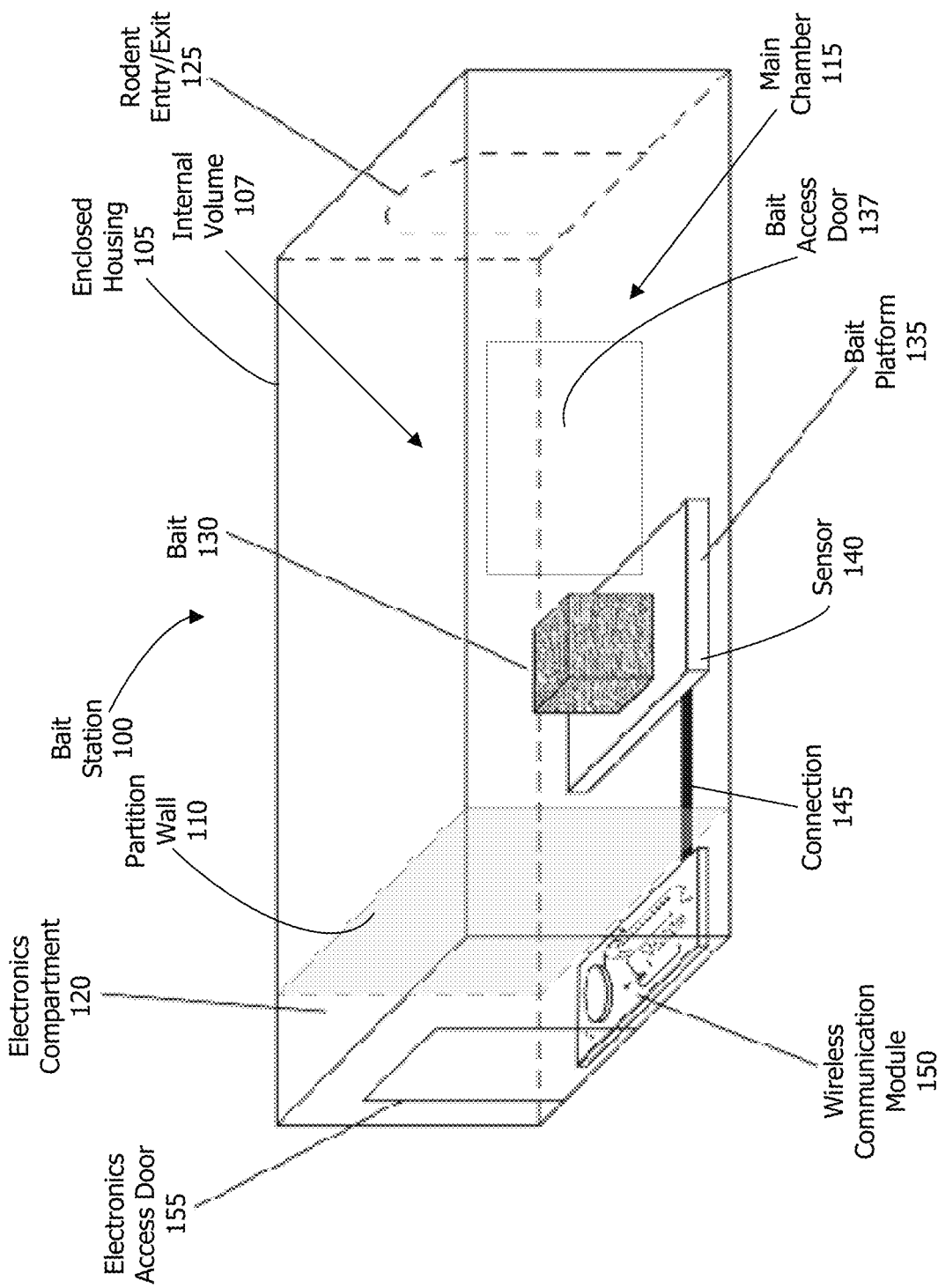
FIG. 1 depicts a transparent perspective view of an electronic bait station monitoring system in accordance with an exemplary embodiment.

The following description is intended to convey a thorough understanding of the embodiments by providing specific embodiments and details involving an electronic bait station. It should be appreciated, however, that the present invention is not limited to these specific embodiments and details, which are exemplary only. It is further understood that one possessing ordinary skill in the art, in light of known systems and methods, would appreciate the use of the invention for its intended purposes and benefits in any number of various embodiments, depending on specific design and other needs.

While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. For example, some of the modules or functionality associated with the modules may be supported by a separate application or platform. Other implementations and architectures may be realized. It should be appreciated that embodiments described may be integrated into and run on a computer, which may include a programmed processing machine which has one or more processors. Such a processing machine may execute instructions stored in a memory to process the data and execute the methods described herein.

With regard to the exemplary embodiments of the bait station described below, any part that fastens, mounts, attaches, or connects any component to form the bait station shall not be limited to any particular type and is instead intended to encompass all known and conventional fasteners like screws, nut and bolt connectors, threaded connectors, snap rings, detent arrangements, clamps, rivets, toggles, etc. Fastening may also be accomplished by other known fitments like leak-tight seals or sealing devices. Components may also be connected by adhesives, glues, welding, ultrasonic welding, and friction fitting or deformation. Of course, combinations of these fitment systems might be used.

Unless otherwise specifically disclosed, materials for making components of the present invention may be selected from appropriate materials, such as metal, metal alloys, natural or manmade fibers, composites, vinyl, plastics, silicone, rubber, and so on. Any and all appropriate manufacturing or production methods, such as casting, pressing, extruding, molding, or machining may be used to construct the exemplary embodiments or their components.

While various embodiments may be described in the context of rodents and insects herein, various embodiments may have application to various other pests. The bait station may be appropriately modified to accommodate those additional pest types; however the operation may be as described herein.

Lastly, when describing an exemplary embodiment of the bait station, any reference to front and back or rear, top and bottom, right and left, upper and lower, etc., is intended for the convenience of describing such embodiment only. Such references do not limit the exemplary embodiment or its components to any specific positional or spatial orientation.

Exemplary embodiments of the bait station will now be described more fully with reference to the accompanying drawings, in which some, but not all, embodiments are illustrated.

FIG. 1 illustrates an exemplary embodiment of a bait station 100. It should be appreciated that FIG. 1 illustrates a simplified view of an exemplary bait station 100, and its components, and that bait station 100 may include additional elements that are not depicted. Additionally, in various embodiments, the bait station 100 may have different shapes and configurations.

The bait station 100 may have an enclosed housing 105, defining an internal volume 107. The internal volume 107 may be divided by a partition wall 110 into a main chamber 115 and an electronics compartment 120. Main chamber 115 may be configured to include a rodent or insect entry/exit 125. The electronics compartment 120 may be configured to include an electronics access door 155. The electronics access door 155 may be normally closed to prevent access by rodents or insects and to protect the electronics therein. The electronics access door 155 may be secured in a variety of manners using latches or other securing methods. The electronics access door 155 may use a child-proof type securing mechanism to prevent tampering by children.

In another exemplary embodiment, bait station 100 may have no electronics access door 155, and the electronics compartment 120 may be accessible only when the bait station is opened for replacement of the bait. It should be appreciated that while FIG. 1 depicts the bait station 100 a transparent, this is merely done to allow for viewing the internal structure of the bait station 100. According to exemplary embodiments, the bait station 100 may be opaque. In some embodiments, the bait station 100 may be transparent as depicted to allow for viewing of the contents, such as the status of the bait 130.

The main chamber 115 contains a bait 130. The bait 130 may be placed upon a bait platform 135. The bait 130 may be positively secured to bait platform 135 such that a rodent or insect may consume the bait 130 on the platform 135, but may not remove the bait 130 from the platform 135. The bait 130 may be any type of rodenticide or insecticide. While the bait 130 is depicted in a block shape, other shapes of bait may be used. The type and shape of the bait 130 used may vary based on the pest type targeted by the bait station. The main chamber may be subdivided with additional partition walls to force a rodent or insect to alter its path of travel to get to the bait 130. For example, a partition wall may be placed inside of the entry/exit 125 that forces the rodent or insect to turn 90 degrees to enter the bait station 100. Such a partition may also prevent a child, non-targeted pest, or larger animal from being able to access the bait 130 directly through the entry/exit 125.

The bait platform 135 may be spring mounted. For example, the bait platform 135 may be configured to be at maximum compression when the bait 130 is new or unconsumed. As rodents or insects eat the bait 130, the platform 135 may decompress and moves in an upward direction in response to the decreased weight of the bait. The bait platform 135 may contain a sensor 140 configured to represent bait platform 135 movement. Sensor 140 may be selected based on operational requirements, i.e., low cost, high accuracy, etc. For example, sensor 140 may be a contact switch, a digital weight scale, a tilt meter, a flex meter, a magnet switch, an infrared sensor, or some other suitable sensor.

In embodiments where the sensor 140 is a type mounted under the bait platform 135, the platform 135 may be surrounded along the perimeter on all four sides by a wall extending up from the base to a height sufficient to prevent potential rodent or insect access to the area under the platform 135 as it rises due to bait 130 consumption, but not so high that it deters rodents or insects from accessing the bait 130 on the platform 135.

A bait access door 137 may be located on a wall of the housing 105. An exemplary bait access door 137 is depicted in FIG. 1, but it should be understood that the bait access door 137 may be located in other locations on the housing 105. The bait access door 137 may be provide access to the internal volume 107 to allow for visual inspection of the bait 130 and replacement of the bait 130 as required. In some embodiments, as described above, the electronics access door 155 may not be present and the interior volume 107 of the bait station 100 may be accessed through the bait access door 137. The bait access door 137 may be secured in a variety of manners using latches or other securing methods. The bait access door 137 may use a child-proof type securing mechanism to prevent tampering of the bait station 100 by children in order to prevent exposure to the bait 130.

Sensor 140 may be configured to provide a continuous signal to wireless communication module 150 through an electrical connection 145. The electrical connection 145 travels between the sensor 140 and the wireless communication module 150 and through the partition wall 110. In various embodiments, the electrical connection 145 may be a wire consisting of a strengthened protective outer jacket to prevent damage due to rodents or insects biting through the wires and creating a short or a ground fault. In other embodiments, the electrical connection 145 may be contained in, or covered by, a removable shielded channel that prevents physical access to the electrical connection 145 by rodents or insects. The electrical connection 145 may also provide for power required by sensor 140. The power may be provided from the wireless communication module 150.

In various embodiments, when the sensor 140 is a contact switch, the bait platform 135 may contact a number of discrete contact points based on the vertical position of the bait platform 135. As the bait 130 is consumed and the bait platform 135 rises, subsequent contact points of the sensor 140 are engaged by the bait platform 135 and correspondingly different signals are sent to the wireless communications module 150. The different signals may be correlated to the amount of remaining bait 130, i.e., if there are four discrete, equally spaced contacts, they signals may be configured to represent 75%, 50%, 25%, and 0% of bait 130 remaining More or less discrete contacts may be utilized for more or less resolution as to the amount of remaining bait.

In various embodiments, when the sensor 140 is a digital weight scale, a continuously variable analog signal may be transmitted from the sensor 140 to the wireless communication module 150. The analog signal provided by a digital weight scale may be accurate and allow for greater resolution as to the status of bait 130 consumption within the bait station 100. The analog signal generated by a digital weight scale may ultimately be displayed in its native form, namely the weight of the remaining bait, or it may be configured to output a representation of a percentage of remaining bait 130 through a conversion algorithm.

In various embodiments, when the sensor 140 is a flex sensor, a continuously variable analog signal, similar to a digital weight scale described above may be generated. When the platform 135 is weighted by the bait 130, the flex sensor under the bait platform 135 is at maximum deflection, as the bait 130 is consumed, the bait platform 135 rises, reducing the force on the flex sensor, thereby reducing the deflection. The resulting analog sensor signal may be configured to output a representation of a percentage of remaining bait 130.

In various embodiments, when the sensor 140 is a magnet switch, a single binary type signal may be generated. The portion of the switch with the wired lead may be installed into a hole in the surface of the bait platform 135 with the wired lead entirely concealed under the bait platform 135. The magnet portion of the switch may be attached to and the interior ceiling of the bait station housing 105. As the bait 130 is consumed and the bait platform 135 rises, the two halves of the magnet switch get closer to each other. The switch is calibrated such that when the bait is fully consumed, the two halves of the switch make contact, complete the circuit, and send a signal to the wireless communication module 150. The signal sent by the magnetic switch may be configured to represent that the bait is fully consumed; that is, the signal may represent two states: all the bait is present and the bait is consumed. The magnet switch may be protected against rodent or insect damage by a number of different means including physical shielding, a durable switch casing, or the like.

In various embodiments, when the sensor 140 is an infrared sensor, the bait platform 135 would not need to be spring loaded. The infrared sensor can be placed on opposite sides of the bait 130 such that the bait 130 blocks the path of the infrared beam between the two portions of the infrared sensor. Once the bait 130 is consumed to the point that it no longer blocks the infrared beam, the infrared sensor circuit is completed and a digital signal is sent to the wireless communications module 150. The infrared sensor may be calibrated to complete the sensor circuit at any given percentage of bait 130 consumption based on physical placement of the infrared sensor relative to bait 130, for a given size of bait 130. The resulting signal may then be configured to indicate a percentage of consumed bait 130. The infrared sensor may be protected against rodent or insect damage by a number of different means including physical shielding, a durable sensor casing, or the like. The lead from the infrared sensor may be protected from rodent or insect damage by utilizing a protective outer jacket or by running the infrared sensor lead in a removable shielded channel. In another embodiment, the infrared sensor lead is the wired electrical connection 145.

The wireless communication module 150 may be battery powered or hardwired to a power source. As described above the wireless communications module 150 may provide power for the sensor 140. The wireless communication module 150 may transmit a sensor signal and system status data to one or more electronic devices. The one or more electronic devices may include, but not be limited to, laptop computers, desktop computers, workstations, and portable electronic devices. Portable electronic devices may include tablet computing devices, smartphones, personal data assistants, cell phones, and the like. The wireless communications module 150 may be a transmitter or a transceiver, capable of both transmitting and receiving data.

The wireless communication module 150 may transmit and receive data utilizing various network transmission paths. For example, data may be transmitted and received using Wireless Application Protocol ("WAP"), Multimedia Messaging Service ("MMS"), Enhanced Messaging Service ("EMS"), Short Message Service ("SMS"), Global System for Mobile Communications ("GSM")-based systems, LTE-based systems, Code Division Multiple Access ("CDMA")-based systems, Transmission Control Protocol/Internet ("TCP/IP") Protocols, D-AMPS, Wi-Fi, Fixed Wireless Data, Near Field Communications ("NFC"), Bluetooth, IEEE 802.11b, 802.15.1, 802.11n and 802.11g, or other protocols and systems suitable for transmitting and receiving wireless data. Additionally, data may be transmitted over other RF and mesh networks. In some embodiments, the wireless communication module 150 may be required to transmit data over long distances. In other embodiments, the wireless communication module 150 may be required to transmit data over shorter distances to a receiver or relay point, that may take over the data transmission. An appropriate transmission protocol may be selected to meet the operation requirements. In some embodiments, the wireless communication module 150 may be capable of utilizing a variety of transmission paths. In various embodiments, the wireless communication module 150 may be replaceable such that different modules may be used that use different transmission protocols. Thus, the bait station 100 may be adapted to different operational environments.

Data transmitted by the wireless communication module 150 may be received and displayed on one or more electronic devices as described above. The receiving electronic device may include bait station monitoring software that may provide for display of the information from the bait station. The software may be installed in the form of a program, application, and/or widget on the electronic device. The software may be tangibly embodied in one or more non-transitory physical media, such as, but not limited to, a compact disc ("CD"), a digital versatile disc ("DVD"), a floppy disk, a hard drive, read only memory ("ROM"), random access memory ("RAM"), and other physical media capable of storing software, or combinations of different media.

Figures 2A, 2B:
FIG. 2a depicts an exemplary embodiment of a bait station monitor overview screen.
FIG. 2b depicts an exemplary embodiment of a bait station monitor detail screen.

FIG. 2a depicts a bait station monitor overview screen 200 according to exemplary embodiments. For example, the overview screen 200 may be displayed on a smartphone. The ID column 205 lists all electronic bait stations 100 set up by the user for monitoring. The ID of a given bait station 100 may be assignable by a user and may consist of alphanumeric characters. This particular embodiment is directed to rodent bait stations, however, the screens depicted in FIGS. 2a-2d are applicable to insect or other pest bait stations. Similarly, the location column 210 contains entries which may be assigned by a user and may consist of alphanumeric characters. The location column 210 is intended to indicate the physical location of a given bait station. The "%" column 215 lists the remaining bait 130 in a given bait station 100. The values in the % column 215 are interpreted based on the sensor 140 data transmitted by the wireless communication module 150. The values displayed in this column are dependent on the type of sensor 140 used in the bait station 100. For example, for a bait station 100 utilizing a magnetic switch, % column 215 may only display 100 or 0, whereas a bait station 100 with a flex sensor may display any number between 100 and 0, or fractions thereof. The bait station monitor overview screen 200 may be configured to highlight a particular bait station 100 when a user selected threshold value in the % column 215 is reached. The values in the % column 215 may be computed by the wireless communication module 150 prior to transmission of the data. The status column 220 may indicate the current operational status of a given monitored bait station 100. If a bait station 100 goes offline, loses power, or is manually shut off, the status column 220 may show a status of "OFF." If the display device receives data from a bait station 100 and the data indicates proper operation, the status of that bait station 100 may show as "ON." If the display device receives problem or fault information from the bait station 100, a graphic may be displayed in the status column 220 indicative of a fault. The overview screen 200 may be sortable by any column, as selected by a user.

One or more of the rows on the bait station monitor overview screen 200 may be user selectable. Once a user clicks on one of these user selectable fields, an individual bait station detail screen 300 is displayed, which corresponds to the particular bait station 100 selected by the user. FIG. 2b depicts an embodiment of a bait station detail screen 300. The bait station detail screen 300 may display additional information about a particular bait station 100, such as detailed location information, directions to the bait station 100, or other pertinent information relating to the location of the selected bait station 100. Bait station detail screen 300 may also provide additional details regarding the status of the selected bait station 100. For instance, if the bait station 100 has an active fault, the specifics of the fault may be displayed on the detail screen 300. If the status is "ON" or "OFF," the detail screen 300 may provide a counter for how long the bait station 100 has been in that status. The detail screen 300 may also display the history of the bait % reading over time. The detail screen 300 may also be able to flag the specific times when bait % changes were the greatest. The detail screen 300 may be able to display pertinent maintenance information such as when the bait 130 was last replaced and the name of who replaced the bait 130. The detail screen 300 may also include information as to when the battery was last replaced for battery operated bait stations. The bait station detail screen 300 may also be capable of displaying the battery life remaining for a selected bait station 100, in percentage, simple graphical form, or other easily identifiable means. The bait station detail screen 300 may also be capable of displaying the model of bait station 100 and the type of bait 130 used or recommended for use with the bait station 100. The detail screen 300 may also be capable of displaying the type of sensor 140 used in the selected bait station 100 as well as providing a real-time display of the raw sensor 140 signal. Other relevant data and information may be displayed on the bait station detail screen 300.

Figure 2C:
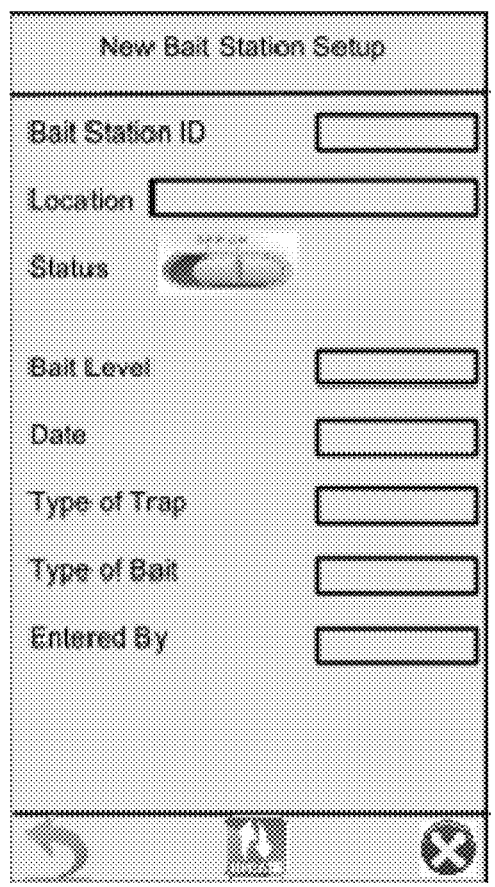
FIG. 2c depicts an exemplary embodiment of a bait station monitor new station setup screen.

FIG. 2c depicts a bait station setup screen 400. Entry of a new bait station 100 through the bait station setup screen 400 results in the bait station 100 appearing in the bait station overview screen 200 and further allowing a user to click on that bait station 100 to open the bait station detail screen 300 for that new bait station 100. The bait station setup screen 400 may contain fields for entry by the user corresponding to the parameters of a particular bait station 100. These parameters may include: ID, Location, Date in service, bait station model, type of bait used, and others. The setup screen 400 may also allow entry of detailed location description information. Setup screen 400 may provide a virtual switch, button, or other means for manually turning the bait station off. If the recommended bait 130 for the bait station 100 is used, then the sensor 140 may be preconfigured to operate correctly with the bait 130, but if other bait 130 is used, sensor 140 calibration may be required. The bait station setup 400 may provide for calibration of the bait station sensor 140 relative to the bait 130 used. For example, if a bait station 100 with a flex sensor is used, a virtual tare button may need to be pressed on the setup screen 400 before any bait 130 is placed on the bait platform 135. Then once the bait 130 is placed on the bait platform 135, a second virtual button is pressed on the setup screen 400 indicating 100% bait load. The bait monitoring software may then calibrate the range of raw analog sensor 140 signal to the remaining bait percentage. The same type of procedure may be used for a sensor 140 like the contact switch. In the case of a contact switch, however, use of non-recommended bait 130 could result in loss of resolution if the bait does not weigh enough because there are discrete contact steps that may not be engaged by a custom bait 130. Additionally, if the bait 130 weighs too much, or if too much bait 130 is used on a sensor 140 like the contact switch, the software may not be able to accurately display the relative percentage of remaining bait 130, although it would still be able to accurately display when the bait 130 needs to be replaced.

Figure 2D:
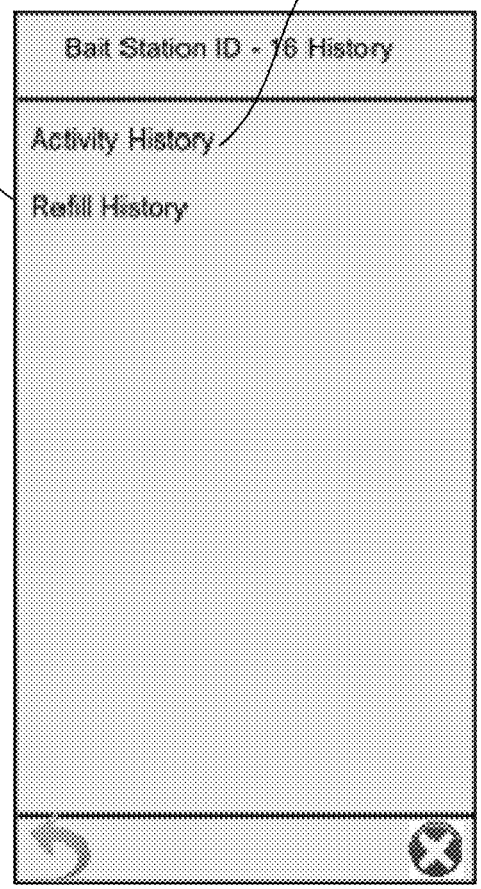
FIG. 2d depicts an exemplary embodiment of a bait station monitor history screen.

FIG. 2d depicts the bait station activity log screen 500 for a particular bait station 100. There may be a discrete activity log screen 500 for each bait station 100. The activity log screen 500 may be divided into bait refill history 505 and activity history 510. The activity history 510 may include discrete entries as to the particular action taken at each maintenance event, such as "replaced bait," "checked station for active fault," etc. The activity log 510 may include the name of the user who accessed the bait station. The activity log 510 may also include information as to when the battery was last replaced for battery operated bait stations. The refill history 505 may include only information relating to bait refill maintenance events, such as the bait used at each refill, the technician responsible, whether recommended or other bait was used, if other bait was used, if the sensor was calibrated, and pertinent bait consumption statistics that may help to display the efficacy of a particular bait strategy.

The various bait station monitor screens may be configured with a scrollable interface in the event that the amount of data to be displayed exceeds the available display space. The bait station monitor screens may also include a page structure such that instead of scrolling, a user may access any excess information or data by selecting sequentially numbered pages.

The various embodiments are not to be limited in scope by the specific embodiments described herein. Further, although some of the embodiments of the present disclosure have been described herein in the context of a particular implementation in a particular environment for a particular purpose, those of ordinary skill in the art should recognize that its usefulness is not limited thereto and that the embodiments can be beneficially implemented in any number of environments for any number of purposes. While the foregoing description includes many details and specificities, it is to be understood that these have been included for purposes of explanation only, and are not to be interpreted as limitations of the various embodiments. Many modifications to the embodiments described above can be made without departing from the spirit and scope of the invention.

What is claimed is:

1. An electronic bait monitoring system, comprising:
a bait station comprising an enclosed housing defining an internal volume, wherein the internal volume is divided by a partition wall defining a main chamber and an electronics compartment;
the electronics compartment having a wireless communication module comprising a computer processor and transceiver;
the main chamber having a single access for a targeted type of pest and a bait access door;
a bait platform located within the main chamber the bait platform being spring mounted in a vertical direction; and
a bait monitoring sensor located within the main chamber that is communicatively coupled with the wireless communication module, the bait monitoring sensor comprising a contact switch that indicates a vertical position of the bait platform in discrete increments.

2. The system of claim 1, wherein the targeted type of pest comprises rodents.

3. The system of claim 1, wherein the targeted type of pest comprises insects.

4. The electronic bait monitoring system of claim 1, wherein the electronics compartment has an electronics access door.

5. The electronic bait monitoring system of claim 1, wherein the bait access door provides access to the electronics compartment.

6. The electronic bait monitoring system of claim 1, wherein the bait monitoring sensor is communicatively coupled with the wireless communication module through an electrical connection that is physically shielded from the targeted type of pest.

7. The electronic bait monitoring system of claim 1, further comprising bait positioned on the bait platform.

8. The electronic bait monitoring system of claim 1, wherein the discrete increments are correlated to an amount of remaining bait.

9. The electronic bait monitoring system of claim 8, wherein the discrete increments are correlated to a percentage of remaining bait.

10. An electronic bait monitoring system, comprising:
a bait station comprising an enclosed housing defining an internal volume, wherein the internal volume is divided by a partition wall defining a main chamber and an electronics compartment;
the electronics compartment having a wireless communication module comprising a computer processor and transceiver;
the main chamber having an access for a targeted type of pest and a bait access door;
a bait platform located within the main chamber;
a bait monitoring sensor located within the main chamber that is communicatively coupled with the wireless communication module, the bait monitoring sensor being configured to monitor an amount of bait in the main chamber;
a network element, wherein the network element comprises one or more processors, the network element being configured to:
receive, via a network, a signal from the wireless communication module of one or more bait stations; and
provide, via the network, the wireless communication module signal to a software program on one or more electronic devices; and
the software program being configured to interpret and display information pertaining to the one or more bait stations based on the wireless communication module signal, wherein the software program is further configured to translate a raw signal from the bait monitoring sensor to a percentage of remaining bait for display.

11. The system of claim 10, wherein the targeted type of pest comprises rodents.

12. The system of claim 10, wherein the targeted type of pest comprises insects.

13. The electronic bait monitoring system of claim 10, wherein the software program is further configured to calibrate the bait station sensor relative to a bait selected for use with the bait station.

14. The electronic bait monitoring system of claim 10, wherein the software program is further configured to allow a user to monitor one or more discrete bait stations by linking each of the one or more bait stations with the software.

15. The electronic bait monitoring system of claim 14, wherein the software program is further configured to display a bait station location, a bait station status, and the percentage of remaining bait for the one or more monitored bait stations.

16. The electronic bait monitoring system of claim 10, wherein the software program is further configured to display a maintenance history for the one or more monitored bait stations.

17. The electronic bait monitoring system of claim 10, wherein the electronics compartment has an electronics access door.

18. The electronic bait monitoring system of claim 10, wherein the bait access door provides access to the electronics compartment.

19. The electronic bait monitoring system of claim 10, wherein the bait monitoring sensor is communicatively coupled with the wireless communication module through an electrical connection that is physically shielded from the targeted type of pest.

20. The electronic bait monitoring system of claim 10, further comprising bait positioned on the bait platform.

* * * * *